July 23, 1929.　　　　G. N. BYL　　　　1,722,036

DEFLECTION DYNAMOMETER

Filed Aug. 1, 1927

INVENTOR
GEORGE N. BYL
BY
ATTORNEY

Patented July 23, 1929.

1,722,036

UNITED STATES PATENT OFFICE.

GEORGE N. BYL, OF BLOOMFIELD, NEW JERSEY, ASSIGNOR TO WESTERN ELECTRIC COMPANY, INCORPORATED, OF NEW YORK, N. Y., A CORPORATION OF NEW YORK.

DEFLECTION DYNAMOMETER.

Application filed August 1, 1927. Serial No. 209,677.

This invention relates to deflection dynamometers, and its object is to provide a simple and efficient dynamometer for determining the tension in a span of wire.

The measurement of tension in wires is generally accomplished by causing a small length of the span of wire under test to be deflected from normal position and then ascertaining the force necessary to hold the wire thus deflected. In each measurement the distance through which the wire under test is deflected is inversely proportional to the tension in the wire, so that the force necessary to hold the strand deflected is a measure of the tension in the wire.

The dynamometer of this invention comprises a pair of spring bars, a pair of hooks, a gauge, a plunger and a housing for the plunger. The hooks are secured at opposite ends of one bar and receive the strand, the tension of which is to be measured. The bars are secured together at one end and by the housing at their mid-points. When the plunger is forced against the strand the load is transmitted to the spring bars, causing the free ends to separate, the amount of which is a measure of the tension in the strand, the gauge indicating the amount. Means is provided in the plunger operating mechanism for effecting the measurement of wires of different sizes.

Figure 1:
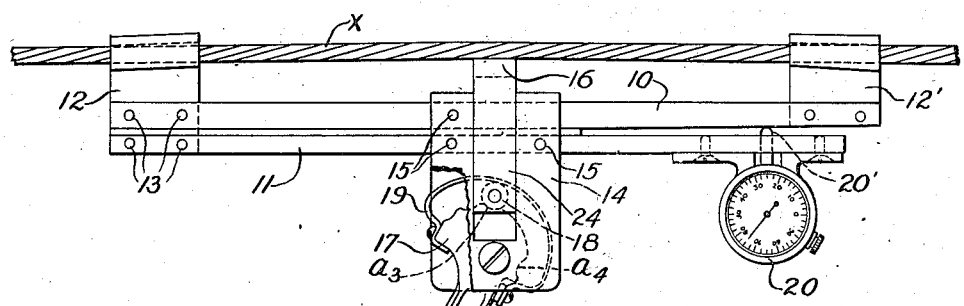
Fig. 1 is a side elevation of the dynamometer showing the handle in operated position.

Referring to the drawing, 10 and 11 are spring bars preferably of rectangular cross-section. They are held together at the left as viewed in the drawing by means of a hook 12 secured to the ends of the arms 10 and 11 by means of rivets 13, their middle portions being secured together by a double armed bracket 14 secured thereto by rivets 15. The bars thus form from their middle to their left hand end portions a rigid structure. The arms of bracket 14 cooperate with each other to guide a plunger 16 and to support a pivoted cam 17. Plunger 16 is formed with arms 23 and 24 in which a roller 18 is journalled. These arms hold the plunger 16 against sidewise movements through its engagement with the bars 10 and 11.

Figure 2:
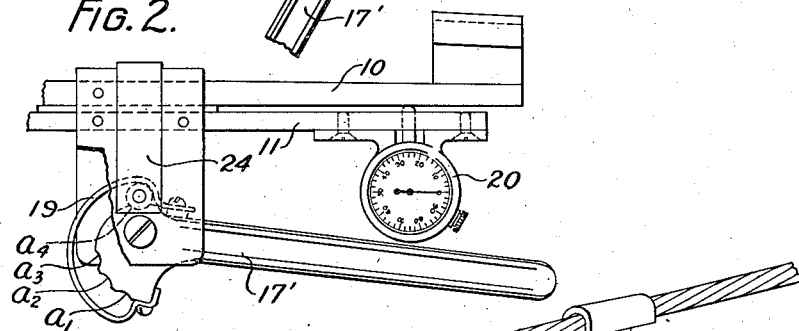
Fig. 2 is a partial side elevation of the dynamometer showing the operating parts in normal non-operated position.
Figure 3:
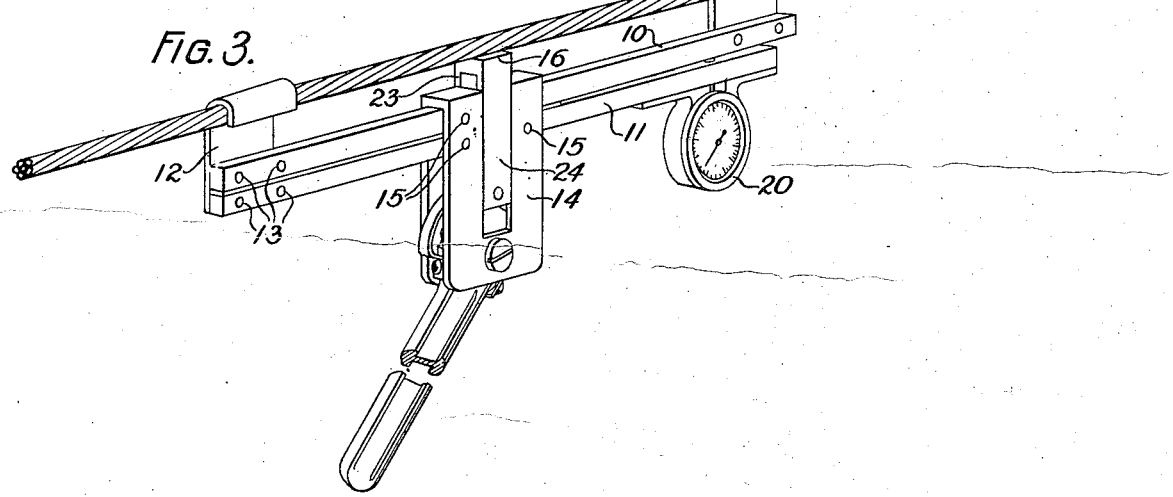
Fig. 3 is a perspective view of the dynamometer showing the operating parts in a position similar to that shown in Fig. 1.

The cam member 17 is disposed in engageable relation with roller 18 and carries a metal strip 19 curved in a manner to follow the effective surface of the cam. This metal strip returns the plunger 16 to normal position upon the movement of the handle 17', which carries the cam, from operated position as shown in Figs. 1 and 3 to normal non-operated position, shown in Fig. 2. Strip 19 is preferably made resilient and exerts a certain pressure against the roller 18 to hold the cam 17 and the plunger 16 actuated thereby in positions determined by recesses $A_1$, $A_2$ and $A_3$ which are positions of the cam 17 for variably actuating plunger 16. These positions are provided for the measurement of wires of different diameters and recess $A_4$ determines the normal non-operated position of cam 17. For more uniform calibration of the dials, it is necessary that the radii from the center of cam 17 to positions $A_1$, $A_2$ and $A_3$ bear such relation to the diameter of the wires to be tested that each wire will be deflected a like amount from its normal position for the same tension and span of each.

On the end portion of beam 10 opposite hook 12 there is mounted a hook 12' which cooperates with the hook 12 for holding the wire in position against the action plunger 16. On the end portion of bar 11 adjacent the hook member 12' is mounted a gauge 20 which may be of any well-known construction. In this gauge, a plunger 20' is held in contact with the resilient portion of bar 10 and is effective to rotate an indicator needle on the face of a graduated dial, upon any relative movement of bar 10 with respect to bar 11.

In the measurement of the tension of a span of wire of a size corresponding to position $A_3$ of the cam the wire is placed in the hooks 12 and 12' as shown in Figs. 1 and 3. The handle 17' and the cam 17 carried thereby are moved from normal position, as shown in Fig. 2, to position wherein the roller 18 engages the recess $A_3$. The movement of cam 17 is effective to impart a longitudinal movement to plunger 16 which engages the wire X, thereby causing the resilient portion of bar 10 to flex an amount dependent upon the tension of the wire.

The movement of the free end portion of bar 10 relative to the index bar 11 is effective to cause the movement of the gauge plunger as above described for actuating the indicator needle which moves on the face of the dial in position for indicating in suitable units of weight the tension of the wire. The measurement of the tension of a span of wire corresponding to either position $A_2$ or $A_1$ may be effected by ascertaining the diameter of the stranded wire under test and moving the cam in position corresponding to $A_2$ or $A_1$, as the case may be, in the manner above described. Cam 17 may be made with a relatively great number of positions similar to $A_1$, and $A_2$ and $A_3$ for measuring a similar number of wires. It is to be noted, however, that due to the fact that a like tension in different wire spans would give different readings for different wire sizes, it is necessary to provide the gauge dial with sets of marks, each of these sets corresponding to a wire size. The angular distances between the marks of the different scales may conveniently be obtained by differently tensioning wire spans by means of known weight within the range of capacity desired.

While this wire tension testing device is shown and described as used in its preferred form, certain changes may be made without departing from the scope of the appended claims.

What is claimed is:

1. A deflection dynamometer comprising a bar, a second bar, means for securing said bars together at a point along their length, other means for securing said bars together at one end thereof, hooks carried by said first bar at its ends for engaging a cable to be tested, a plunger, means for supporting said plunger on said bars, means mounted on said bars for actuating said plunger to engage a cable engaged by said hooks, and a gauge mounted on the free end of said second bar, said gauge having an operating member in contact with the first bar whereby the spacing of said bars at the point of contact may be measured as indicative of the tension of said cable.

2. A deflection dynamometer comprising a bar, a second bar, means for securing said bars together at a point along their length, other means for securing said bars together at one end thereof, hooks carried by said first bar at its ends for engaging a cable to be tested, a plunger, means for supporting said plunger on said bars, means mounted on said bars for operating said plunger to engage a cable engaged by said hooks, including means for holding the same in at least two positions transversely of said bars, and a gauge mounted on the free end of said second bar, said gauge having an operating member in contact with the first bar whereby the spacing of said bars according to one of the positions of said operating means may be measured as indicative of the tension of said cable.

3. A deflection dynamometer comprising a bar, a second bar, means for securing said bars together at a point along their length, other means for securing said bars together at one end thereof, hooks carried by said first bar at its ends for engaging a cable to be tested, a plunger, means for supporting said plunger on said bars, means carried by said bars for operating said plunger transversely of said bars, to engage a cable engaged by said hooks, including a cam member, and a gauge mounted on the free end of said second bar, said gauge having an operating member in contact with the first bar whereby the spacing of said bars according to one of the positions of said operating means may be measused as indicative of the tension of said cable.

4. A device according to claim 3, said cam member having at least two notches in its periphery, a roller on said plunger adapted to engage in said notches for holding the cam in corresponding positions, and means attached to said cam member for holding said roller in contact with said cam member.

In witness whereof, I hereunto subscribe my name this 30th day of July A. D., 1927.

GEORGE N. BYL.